United States Patent Office 2,732,984
Patented Jan. 31, 1956

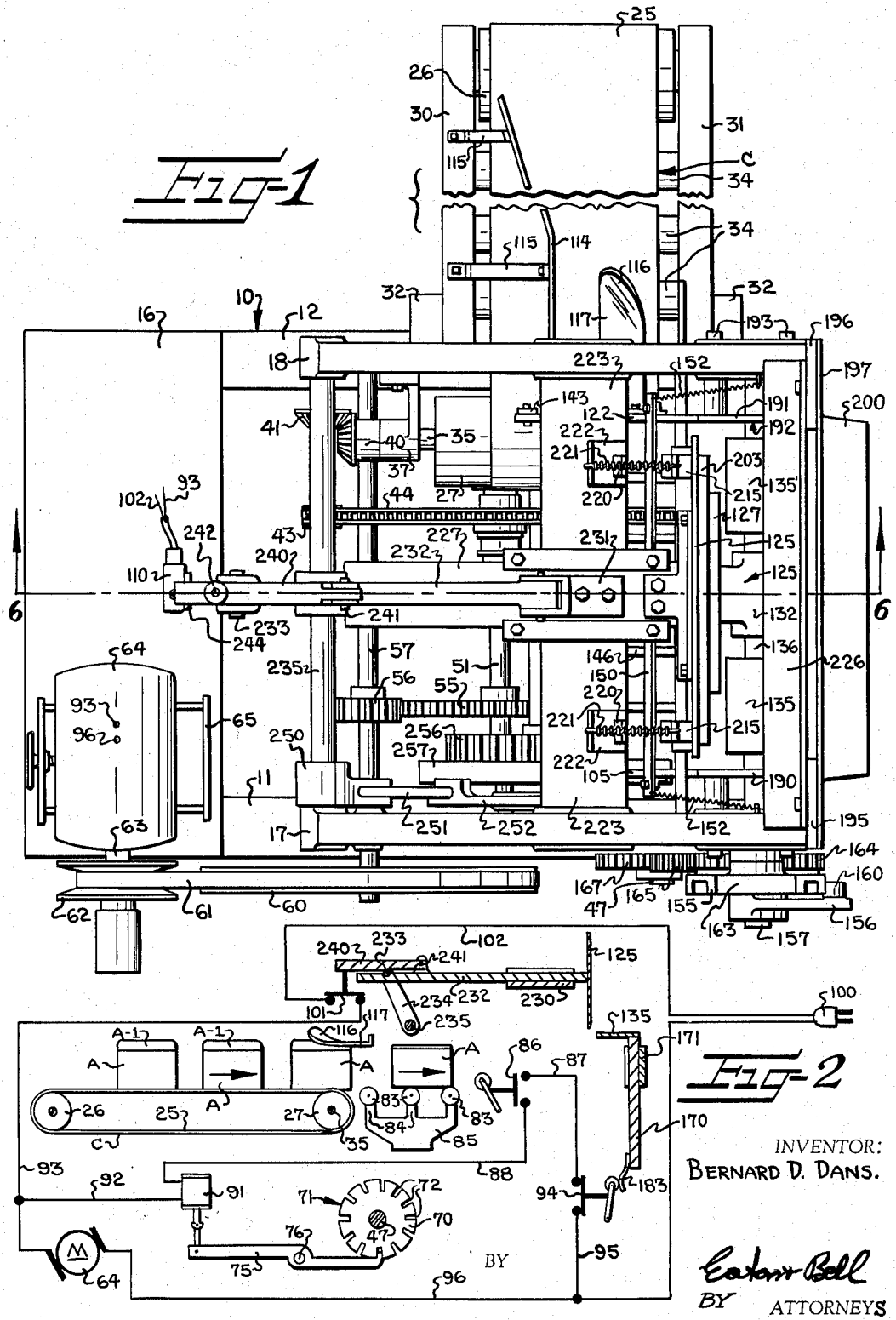

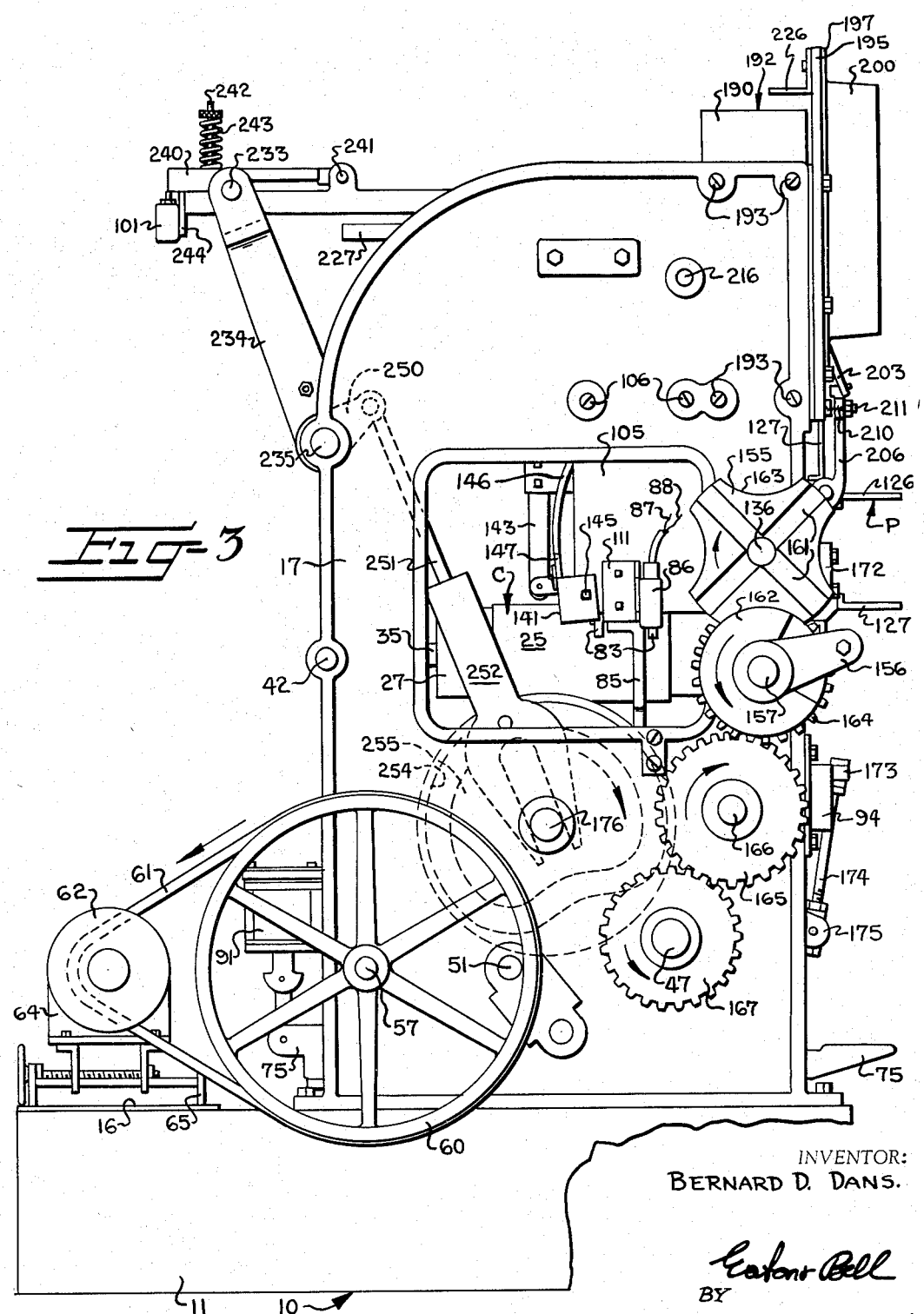

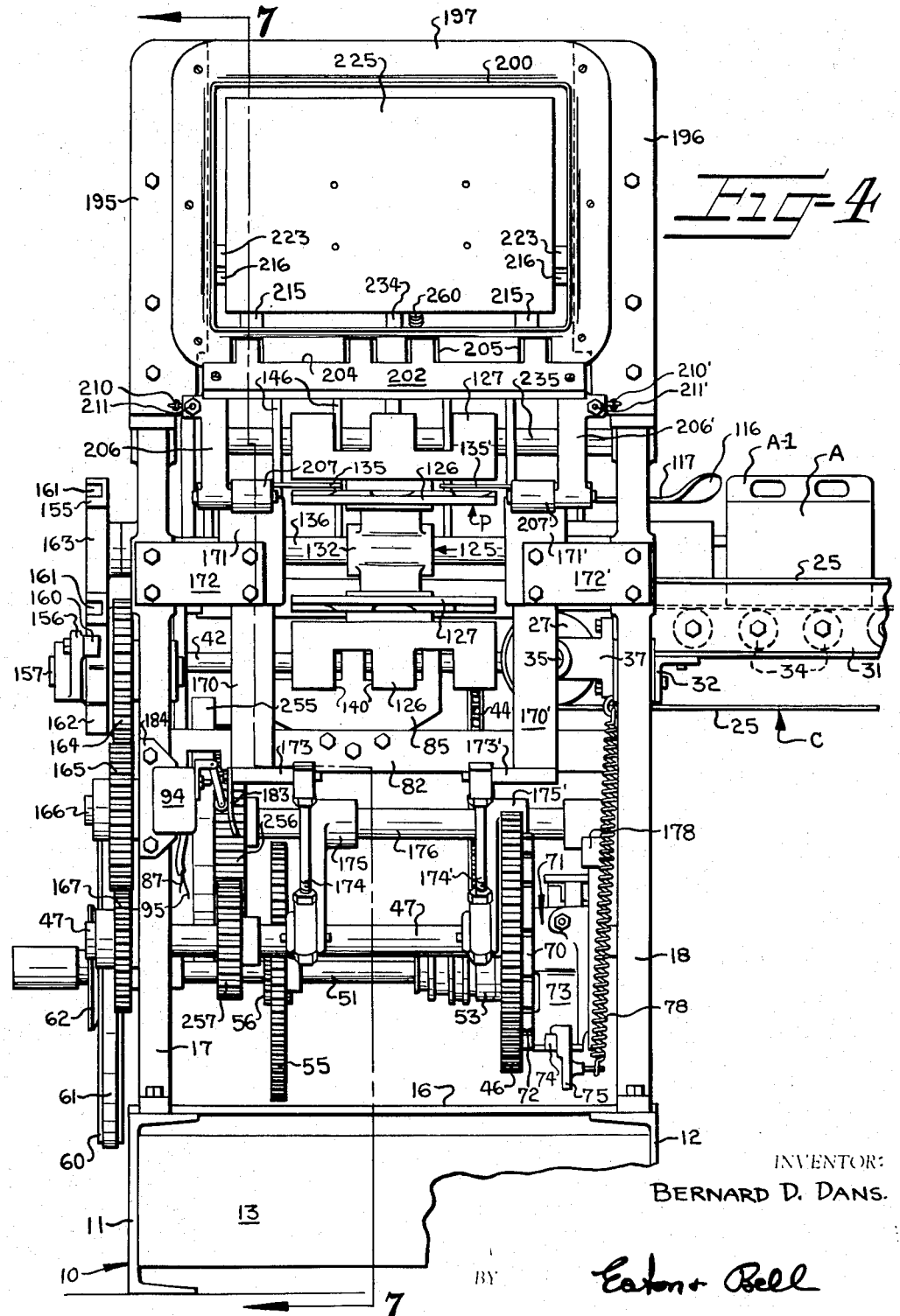

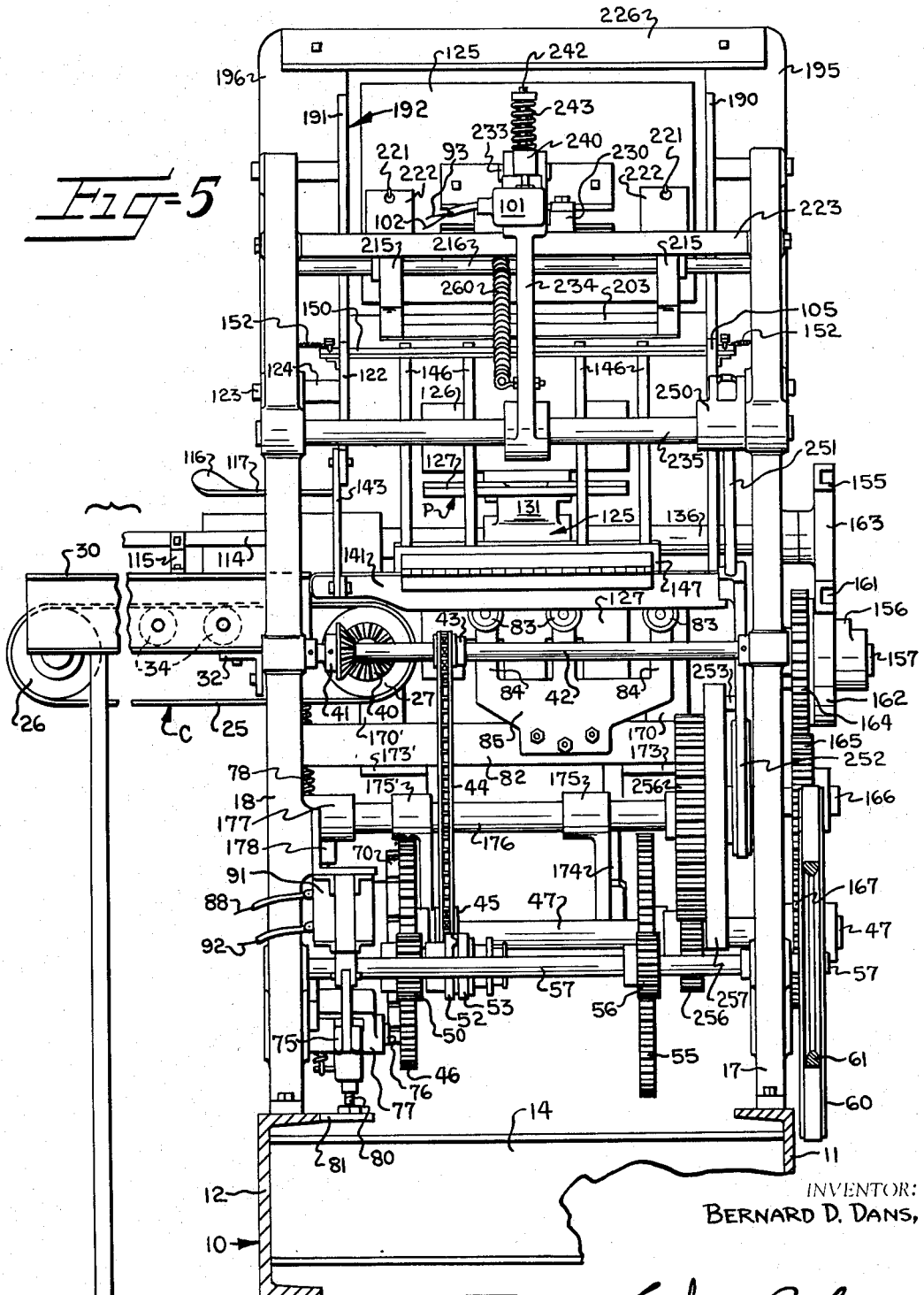

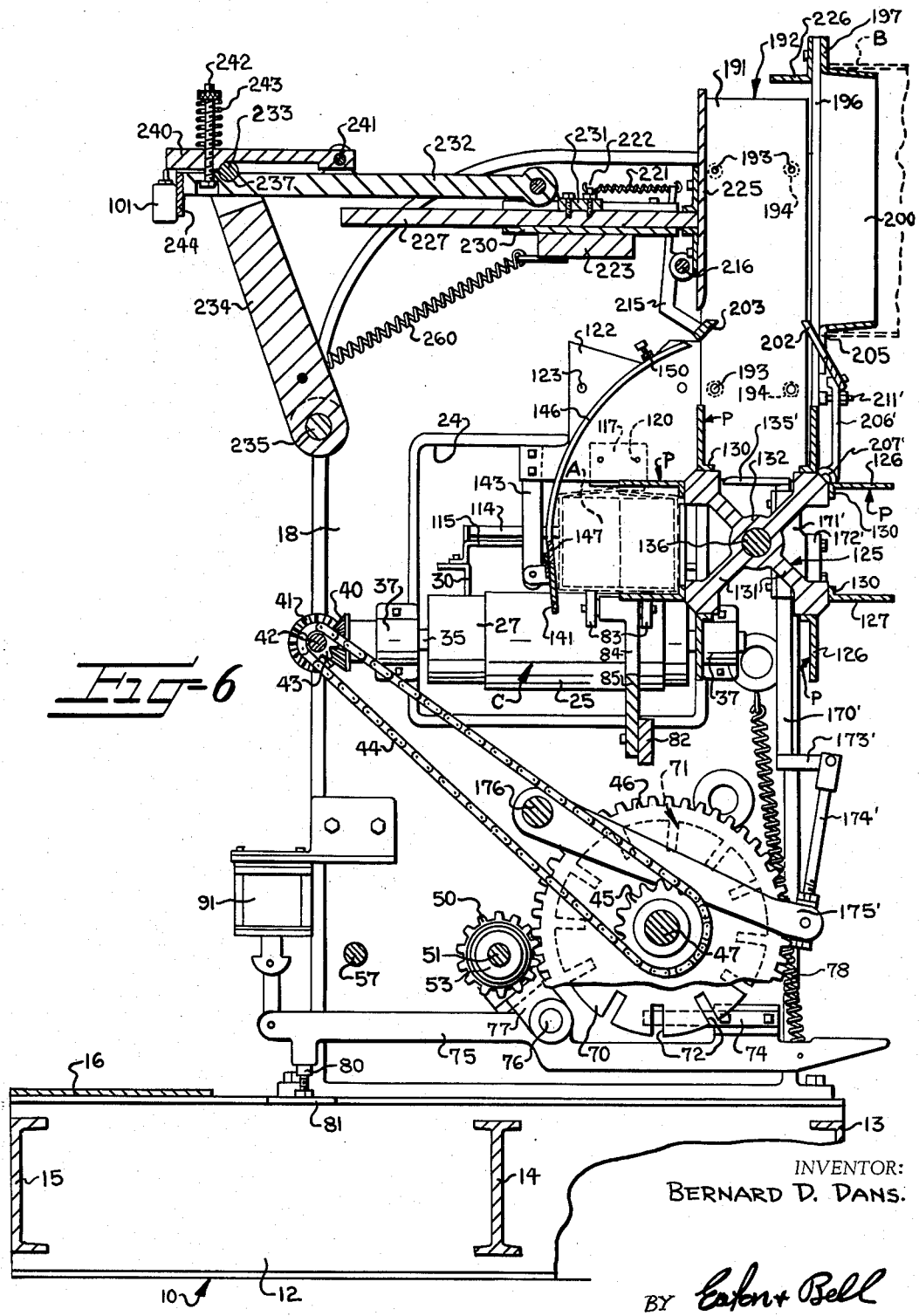

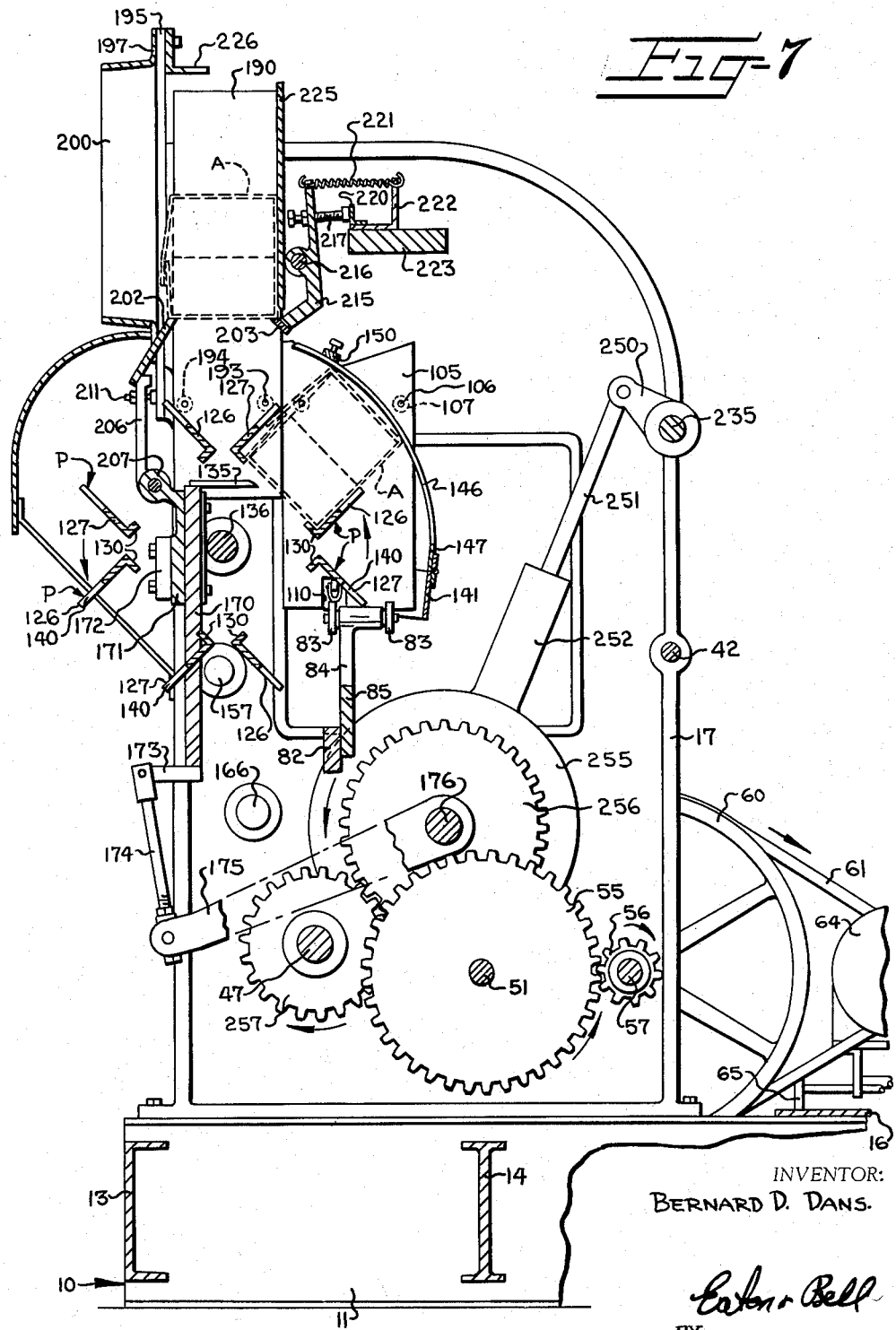

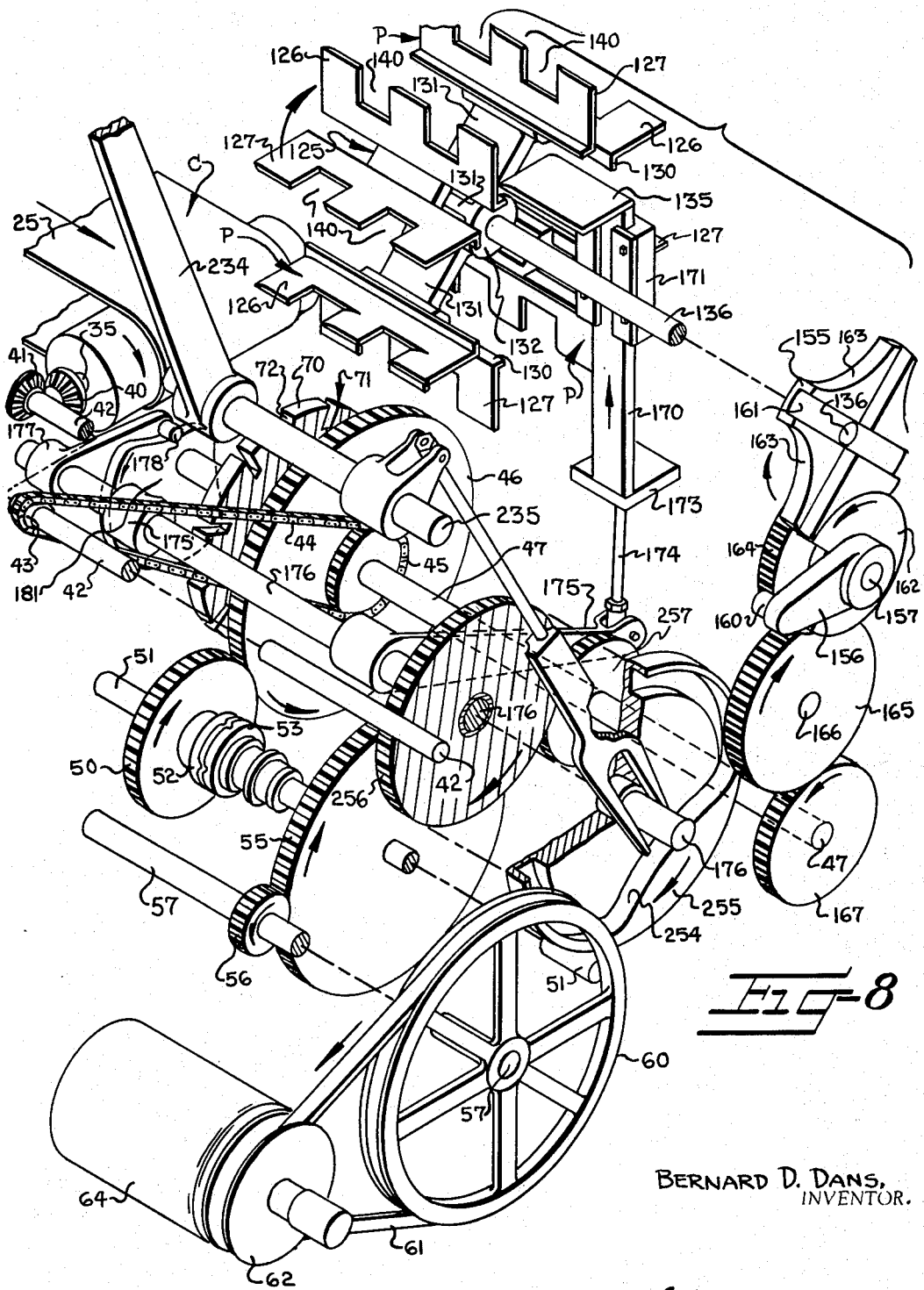

2,732,984

ARTICLE STACKING AND BOXING APPARATUS

Bernard D. Dans, Brooklyn, N. Y., assignor to Dacam Corporation, Charlotte, N. C., a corporation of North Carolina Application July 13, 1953, Serial No. 367,586

14 Claims. (Cl. 226—14)

This invention relates to packaging machinery and, more especially, to an improved machine for receiving and automatically stacking articles, such as carriers or cartons, which may contain canned or bottled commodities, and for inserting or placing a plurality of the stacked articles in a common container, such as a paper board box.

The present invention is concerned with improvements in a carrier stacking and boxing apparatus of a type such as that disclosed in the co-pending application of Grover C. Currie et al., Serial No. 263,206, filed December 26, 1951, now Patent No. 2,677,221, and entitled Machine for Packaging Cylindrical Articles, the present application being a continuation of said co-pending application.

It is the primary object of this invention to provide a machine having means for feeding cartons or other portable articles, with means automatically operable upon a predetermined number of articles being fed into the machine for moving the latter articles upwardly, means for maintaining each successive article or group of articles in raised position as a succeeding article or groups of articles is received by the machine and also projected upwardly, and whereby the subsequent article or articles are moved upwardly against the lower surfaces of preceding raised articles thus forming the articles into stacks.

As the articles are moved upwardly, they are positioned in alinement with an opening in the frame of the machine which opening is defined by a frame on which a box or relatively large open ended container may be positioned with its open end facing said opening in the frame of the machine. Upon a predetermined number of the articles being elevated in juxtaposition, means are provided for automatically moving the stack of articles through the opening in said frame and into the box or container previously positioned in communication with said opening. Thus, the box is filled with the articles or cartons with each complete cycle in the operation of the machine.

It is evident that a machine of this character may be used in association with any of other types of processing machines wherein articles may be directed from the processing machine to the feeding means of the improved article stacking and boxing machine or the articles may be placed on the feeding means of the improved article stacking and boxing machine manually, as desired.

It is another object of this invention to provide a machine of the character described wherein the articles may be fed into the machine in a given position and are automatically revolved and turned upon their sides in advance of being moved upwardly in the stacking operation so that, when the stack of articles is subsequently projected into the box, their normal upper ends may face toward the open end of the box in which they are finally positioned.

Some of the objects of the invention having been stated, other objects will appear as the description proceeds when taken in connection with the accompanying drawings, in which—

Figure 1 is a top plan view of the improved article stacking and boxing machine;

Figure 2 is a diagram of the electrical components of the machine showing many of the mechanical parts in association therewith schematically;

Figure 3 is a side elevation of the improved article stacking and boxing machine looking up at the lower side of Figure 1;

Figure 4 is a front or discharge end elevation of the improved machine with parts broken away;

Figure 5 is an elevation looking at the left-hand side of Figures 1 and 3 with the lower portion thereof partially in section and omitting the electric motor;

Figure 6 is a vertical sectional view through the machine taken substantially along line 6—6 in Figure 1;

Figure 7 is a vertical sectional view looking in the opposite direction from that of Figure 6 and being taken substantially along line 7—7 in Figure 4;

Figure 8 is a schematic partially exploded isometric view of the various operating parts of the machine and omitting the frame of the machine.

Referring more specifically to the drawings, the frame of the machine is broadly designated at 10 and includes a pair of spaced base frame members 11, 12 to which opposite ends of lateral or transverse frame members 13, 14, 15 are connected and which frame members 11, 12 support a motor support plate 16 adjacent corresponding ends thereof. The lower or base frame members 11, 12 also support respective upright or side frame members 17, 18. The remaining parts of the frame 10 will be described as the description proceeds.

In this instance the articles, indicated at A in Figures 2, 4 and 7, are shown in the form of rectangular carriers or cartons having a foldable or bendable handle member or flap A-1 projecting upwardly therefrom, since the present machine is particularly designed for stacking and boxing cartons or carriers of this type. The articles or cartons A illustrated in Figures 2, 4 and 7 are of well known construction and may be of the type shown in the patent to Ombricek, No. 1,829,533 of October 23, 1931. It is to be distinctly understood that the articles A are shown in the form of cartons by way of illustration only since variantly shaped articles may readily be stacked and boxed by means of the present machine. The flap or handle A-1 is shown on each of the cartons, carriers or articles A, since the present machine has means thereon, to be later described, for folding the handle portion A-1 of each successive article A against the upper wall of the article as the articles are fed into the machine. Of course, the machine will operate equally as well upon articles which do not have the foldable flap or handle A-1 thereon.

Any suitable means may be provided for feeding the articles A into the machine and such feeding means may be formed as a part of the machine as illustrated in the instant drawings or the feeding means may be a part of an adjacent machine in which the articles were previously processed. In the present instance, the feeding means is shown in the form of a conveyor broadly designated at C which extends through an opening 24 formed in frame member 18 and which includes an endless belt 25 mounted on spaced rollers 26, 27. The outer roller 26 is suitably journaled between horizontally disposed frame members 30, 31 fixed to a common transverse frame member 32 suitably secured to the upright frame member 18. The frame members 30, 31 may support suitable rollers 34 which, in turn, support the upper reach of the endless conveyor belt 25. The inner roller 27 is fixed on a shaft 35 (Figures 1, 3, 6 and 8) journaled in bearing blocks 37 suitably secured to and projecting inwardly from the upright frame member 18. One end of shaft 35 has a bevel gear 40 fixed thereon which meshes with a bevel gear 41 fixed on a transverse shaft 42.

The shaft 42 is driven continuously by means of a sprocket wheel or pulley 43 fixed thereon which is engaged by an endless belt or sprocket chain 44. The endless belt or sprocket chain 44 also engages a pulley or sprocket wheel 45 integral with or suitably secured to a relatively large gear 46 rotatably mounted on a cam shaft 47 which is intermittently driven in a manner to be presently described. The shafts 42, 47 are suitably journaled in the side frame members 17, 18.

The gear 46 meshes with a gear 50 loosely mounted on a jack shaft 51. The hub of gear 50 has a clutch member 52 fixed thereon which meshes with a mating driving clutch member 53. The clutch members 52, 53 collectively form a safety or slip clutch mechanism which permits the shaft 51 to rotate relative to the gear 50 in the event of rotation of the gear 50 being retarded or interrupted to thereby prevent breakage of the parts driven by the gear 50.

There are many different types of safety clutches which may be employed in the capacity of the clutch 52, 53 such as a type known as Maxitorq floating disc clutch manufactured by the Carlisle-Johnson Machine Company, Manchester, Connecticut, and disclosed in their installation and data book No. 51. Therefore, a detailed description of the clutch mechanism 52, 53 is deemed unnecessary. The clutch member 53 is fixed on the shaft 51 and the shaft 51 is driven by mating gears 55, 56 fixed on the jack shaft 51 and a drive shaft 57, respectively.

The jack shaft 51 and the shaft 57 are also suitably journaled in the frame members 17, 18 of the frame 10 and one end of shaft 57 has a V-pulley 60 fixed thereon which is engaged by an endless V-belt 61, which belt also engages a V-pulley 62 of conventional or any desired construction. The pulley 62 may also be termed as an expansible pulley and is mounted on a motor shaft 63 extending from and driven by an electric motor 64. The electric motor 64 is adjustably mounted on a frame 65 suitably secured to the plate 16 heretofore described.

The V-pulley 62 is of the variable speed type wherein the opposite side portions of the pulley will move toward and away from each other depending upon the tension in the belt 61 mounted thereon. The frame 65 represents a suitable take-up or variable speed control apparatus of usual construction and a detailed description thereof is deemed unnecessary. It is thus seen that the electric motor 64 effects continuous movement of the conveyor C, except in the event of the gear 50 being overloaded, in which instance, the clutch 52, 53 will permit the shaft 51 to rotate independently of the gear 50.

Now, the gear 46 has a disk 70 integral therewith, or suitably secured thereto, which is a part of a single revolution clutch broadly designated at 71. There are many different types of single revolution clutches which may serve in the capacity of the clutch 71, the particular single revolution clutch illustrated being of a type best illustrated in Figures 32 to 36, inclusive, of the patent to Grover C. Currie et al., No. 2,603,924, dated July 22, 1952. Therefore, only a sufficient description of the single revolution clutch 71 will be given to provide a clear understanding of the operation of the present invention.

As heretofore stated, the gear 46 is loosely mounted on shaft 47, and the disk 70 of the single revolution clutch 71 is also loosely mounted on shaft 47. The disk 70 has a plurality of circularly spaced notches 72 therein which are adapted to be engaged, one at a time, by a suitable clutch dog, not shown, but being clearly shown in said Patent No. 2,603,924, and which clutch dog is mounted for movement parallel to the shaft 47 in an arm 73 fixed on the shaft 47 (Figure 4). Said clutch dog is normally held out of engagement with the disk 70 by a clutch knife 74 carried by a lever 75.

The lever 75 is pivoted at 76 on a block 77 (Figures 5 and 6) carried by the side frame member 18. The lever 75 and its clutch knife 74 are normally urged upwardly into operative position by a tension spring 78, one end thereof being connected to one end of the lever 75 and the other end thereof being suitably connected to the member 18 of the frame 10.

As disclosed in said last named patent, upon downward movement of the right-hand end of the lever 75 in Figure 6, the clutch knife 74 moves out of engagement with the clutch dog, not shown, carried by arm 73 and permits the same to engage the next succeeding notch 72 in the disk 70 to thereby impart a revolution to the shaft 47 and, during the course of said revolution, the clutch knife 74 again moves upwardly so that it again engages the clutch dog carried by arm 73 to move the same out of the corresponding notch 72 in the disk 70, thus causing the gear 46 to impart exactly a revolution to the shaft 47 each time the clutch knife 74 is moved downwardly in Figure 6.

In order to insure that the clutch knife 74 is urged to the proper position by the spring 78, the left-hand portion of the lever 75 in Figure 6 engages a suitable bumper 80 adjustably secured to a plate 81 projecting inwardly from the horizontally disposed base frame member 12.

The clutch knife 74 is caused to move downwardly each time a predetermined number of articles A are fed into the machine by the conveyor C. As each article A moves off the inner end of the conveyor C, it passes onto a plurality of spaced pairs of rollers 83, there being three pairs of said rollers shown, and each pair of which is rotatably mounted on an upwardly projecting portion 84 of a common article support 85.

The article support 85 is suitably secured to a transverse frame member 82 whose opposite ends are suitably secured to the upright side frame members 17 and 18. Disposed adjacent the end of the support 85 opposite from the conveyor C is a normally open switch 86 which is closed by each alternate article A positioned on the conveyor C in this instance, the present machine being particularly designed to elevate two articles with each primary cycle thereof as will be later described. The switch 86 has wires 87 and 88 connected to opposite sides thereof and the wire 88 leads to one side of a coil of a solenoid 91 from the other side of which a wire 92 extends to a wire 93. A wire 87 leads from switch 86 to one side of a normally open switch 94 from the other side of which a wire 95 extends to a wire 96. The switch 94 is held in closed position by an elevator mechanism or article lifting mechanism to be later described.

One end of wire 96 is connected to one side of a plug 100 adapted to be connected to a suitable source of electrical energy, not shown, and the other end of wire 96 is connected to one side of the electric motor 64. One end of wire 93 is also connected to the side of the electric motor 64 opposite from that to which the wire 96 is connected and the other end of wire 93 is connected to one side of a normally open safety switch 101, which is held in closed position by means to be later described. The other side of switch 101 has a lead wire 102 leading therefrom to the side of the plug 100 opposite the side to which the lead wire 96 is connected.

It is thus seen that the motor 64 runs continuously and, upon switch 86 being closed, the coil of solenoid 91 is energized causing the plunger thereof to move upwardly in Figure 6. The plunger of solenoid 91 is connected to the left-hand end of the lever 75 and it is thus seen that upon a predetermined number of articles being positioned at the article turning station embodied in the support 85, a revolution is imparted to the primary cam shaft 47.

As the leading article A of each successive group is caused to traverse the rollers 83 due to the forward or inward movement of the next succeeding article in the corresponding group against the same, and which movement is imparted thereto by the conveyor C, each successive leading article A engages a stopping and guiding plate 105 suitably secured to the upright side frame member 17, as by screws 106, but being spaced inwardly from the upright frame member 17 by suitable spacing blocks or sleeves 107 (Figure 7).

It will be noted in Figure 7 that the lower portion of the stopping and guiding plate 105 has an opening 110 therein through which the plunger of switch 86 projects so the leading article of each successive group directed onto the rollers 83 closes the switch 86 as it engages the stopping and guiding plate 105. The switch 86 is suitably secured to a bracket 111 suitably secured to the outer surface of the plate 105.

*Article flap folding means and article turning means*

It will be observed in Figure 5 that the side rails or horizontal frame members 30, 31 of the conveyor C project upwardly above the level of the upper reach of the endless belt 25 and, in order to facilitate ease in positioning the articles or carriers A on the conveyor C, the endless belt is preferably of substantially greater width than the width of the articles. Accordingly, since the articles must be accurately positioned as they are fed onto the rollers 83 of the article support 85, a conveyor guide bar 114 is provided which overlies the endless belt 25 and whose outer end is disposed closely adjacent the side rail or horizontal frame member 30, but which guide member or bar 114 extends inwardly at an angle relative to the direction of movement of the upper reach of the conveyor belt 25 as best shown in Figure 1. The guide bar 114 is suitably secured to the inner ends of brackets 115 which extend outwardly and are suitably secured to the horizontal frame member 30.

It is thus seen that the inner end of the guide bar 114 is spaced from the upper portion of the horizontal frame member 31 of the conveyor C a distance slightly greater than the width of the articles and thereby causes the articles to move laterally of the upper reach of the conveyor belt 25 so they are properly positioned upon the rollers 83 of the article support 85 as they leave the inner end of the conveyor C.

Now, as heretofore stated, the articles A, as illustrated, are each provided with a foldable flap or handle A–1 and, as each successive article approaches the inner end of the conveyor C, the flap or handle portion A–1 thereof engages an upwardly and outwardly formed portion 116 of a flap folding plate 117 whose major portion is spaced above the upper reach of the endless belt 25 a distance slightly greater than the height of each successive article to thereby cause the flap A to be folded against the upper surface of the corresponding article upon being fed onto the rollers 83. The inner end of the flap folding plate 117 is turned upwardly and suitably secured, as by screws 120, to the outer surface of an article turning guide plate 122 which is spaced from, and is similar to, the article stopping and guiding plate 105, but whose lower portion is cut away (Figure 6) to permit the articles to pass therebeneath as they are directed onto the rollers 83 by the conveyor C. The vertically disposed plate 122 is suitably secured to the side frame member 18, as by screws 123, but is spaced from the side frame member 18 by suitable spacing sleeves 124 (Figure 5) surrounding the medial portions of the screws 123.

As the articles A pass onto the rollers 83 of the article support 85, they are partially disposed within one of a plurality of circularly arranged open ended substantially U-shaped pockets of an article turning turret broadly designated at 125, there being four such pockets employed in the present instance and each of which is broadly designated at P.

Each of the pockets P includes a pair of pocket side plates or wall members 126, 127 which are spaced from each other a distance equal to the heighth of the article after the flap A–1 has been folded against the top wall of the article and the inner edges of the side walls or pocket walls 126, 127 are turned inwardly at 130 and are suitably secured to the outer portions of corresponding radial arms 131 of a spider member 132, which is best shown in Figures 6 and 8.

It will be observed in Figures 1, 4, 5 and 8 that the arms 131 of the spider 132 are relatively narrow as compared to the length of the pocket side walls 126, 127 and is disposed intermediate the ends of the pocket side walls 126, 127 in a radial plane. A lifting device or elevator is provided which includes a pair of article lifting plates or elevator platforms 135, 135' which are disposed astraddle the arms 131 of the spider 132 and are mounted for vertical movement between the pocket side plates 126, 127 of each successive pocket P as it is moved to its uppermost position by means to be later described.

The spider 132 of the turret 125 is fixed on a turret shaft 136 suitably journaled in the upright side frame members 17, 18 and is suitably driven, by means to be later described, to move a part of a revolution equivalent to the number of pockets P on the turret 125 in a step-by-step manner. In this instance, there being four pockets shown, the turret 125 is rotated a quarter-revolution in each primary cycle in the operation of the machine so the innermost pocket into which the articles have just been positioned moves upwardly about the axis of shaft 136 to occupy the position of the uppermost pocket P in Figure 6, thus turning the articles originally positioned in the corresponding pocket P above the elevator platforms or lifting platforms 135, 135' and in perpendicular relation to the position they originally occupied when fed onto the rollers 83 of the article support 85.

It will be noted that, when each successive pocket P is in article receiving position, which is the position occupied by the innermost or left-hand pocket P in Figure 6, the lower surface of its then upper pocket wall 127 is disposed on substantially the same level as, or slightly above the level of, the lower surface of the folding plate 117 and the upper surface of its then lower pocket wall 126 is disposed on the same level as, or slightly below the level of, the upper surfaces of the rollers 83. Each of the pocket walls 126, 127 is provided with openings 140 defining projections which straddle the corresponding rollers 83 and projections 84 of the article support 85 in the course of each step in rotary movement by the turret 125. It is also to be noted in Figures 6 and 7 that the pocket walls 126, 127 extend outwardly or substantially radially from the spider 132 to such an extent that the then uppermost wall 127 of the pocket disposed in article receiving position holds the flap or handle portions A–1 of articles directed thereinto in folded position against the upper walls of the corresponding articles.

It is also to be noted that the walls of adjacent pockets P are disposed in closely spaced relationship so that as each successive pocket moves upwardly from article receiving position, the next succeeding article on the conveyor C may engage the adjacent ends of the walls of adjacent pockets until a succeeding pocket P is alined with the conveyor, whereupon the articles are again directed into a pocket P.

As each successive article A is directed from the conveyor into a corresponding pocket P of the turret 125, the article is held in the pocket by a retaining plate 141, one end of which is attached to the lower end of a bar 143 whose upper end is suitably secured to the plate 122 (Figure 6). The other end of the retaining plate 141 is bent at substantially right angles and this bent portion is suitably secured to the outer surface of the article stopping and guiding plate 105, as by a screw 145 (Figure 3).

Now, as each article or group of articles positioned in one of the pockets P is turned, with a step in movement by the turret 125, the article or group of articles is held in the corresponding pocket P by a plurality of resiliently mounted article retaining or pressing bars 146 whose lower ends in Figures 5, 6 and 7 are connected to a common horizontal bar 147 hingedly connected to the upper edge of the retaining plate 141. The upper ends of the arcuate retaining bars 146 are maintained in proper spaced relationship by a common bar 150 suitably connected to the upper portions of the arcuate retaining bars 146 and whose opposite ends extend outwardly beyond the plates 105, 122 and are connected to corresponding ends of tension springs 152 whose other ends are suitably connected to the corresponding upright frame members 17, 18 (Figures 1, 5 and 6).

It will be noted that the free ends of the arcuate article pressing bars 146 are limited as to their inward movement toward the turret 125 by means of the bar 150 engaging the upper edges of the plates 105 and 122. The plates 105 and 122 are spaced from each other a distance equal to, or slightly greater than, the length of each successive group of articles directed into a corresponding pocket P of the turret 125 to thereby maintain the group of articles in juxtaposition as a step in movement is subsequently imparted to the turret 125, during which the articles positioned in the innermost or left-hand pocket P in Figure 6 are moved upwardly in an arcuate path and turned upon their sides and positioned above the elevator or lifting platforms 135, 135'. Of course, during each step by the turret 125, the elevator platforms or lifting platforms 135, 135' are disposed inwardly of the arcuate path of movement of the portions 130 of the pocket side walls 126, 127.

Driving means for article turning turret

Any desired means may be employed for imparting step by step rotary movement to the article turning turret 125. The preferred means for driving the article turning turret 125 includes a four-point Geneva wheel 155 fixed on shaft 136 which is driven by a crank 156 rotatable on a stub shaft or stud 157 fixed to, and projecting outwardly from, the upright side frame member 17 of the frame 10. The crank 156 carries a roller 160 which is adapted to successively engage in slots or grooves formed in the Geneva wheel 155. The crank 156 has an arcuate portion 162 which cooperates with arcuate recesses 163 formed in the Geneva wheel 155 to lock the same against inadvertent rotation.

Integral with, or suitably secured to, the arcuate portion 162 of arm 156 is a gear 164 which is also rotatable on stub shaft 157 and is engaged by a gear 165 rotatably mounted on a stud or stub shaft 166 also suitably secured to the upright side frame member 17 of the frame 10. The gear 165 also meshes with a gear 167 fixed on one end of the shaft 47 heretofore described.

It is thus seen that upon each revolution being imparted to the shaft 47 by means of the single revolution clutch 71 and the closing of switch 86 by the leading article in each successive group of articles positioned in one of the pockets P of the turret 125, a quarter-revolution is imparted to the shaft 136 through the train of gears 164, 165, 167 and the roller 160 on arm 156 traversing a corresponding slot or groove 161 in the Geneva wheel 155. This may be termed as a second step in the primary cycle of the machine, the first step being the feeding of a group of articles or an article into one of the pockets P of the article turning turret 125.

Article lifting and stacking means

During the course of each revolution of the shaft 47, a quarter-revolution is first imparted to the article turning turret 125, whereupon the elevator platforms 135, 135' move upwardly and then return to substantially the position shown in Figures 6 and 8, in a third step in the primary cycle. Since the article lifting plates or elevator platforms 135 and 135' are identical, except being opposite hand, the parts associated with platform 135 will be described only and parts associated with platform 135' will bear the same reference characters with the prime notation added.

As heretofore described, the article lifting or elevator platform 135 is disposed to one side of the spider 132 of the article turning turret 125 and overlies the shaft 136. The elevator platform 135 extends outwardly beyond the vertical plane of the corresponding ends of the pocket side walls 126, 127 and is suitably secured adjacent one edge thereof to the upper end of a guide bar 170 mounted for vertical sliding movement in a guide block 171 (Figures 4, 7 and 8).

Due to space limitations, and for the sake of clearness, the elevator platform 135' and the operating elements associated therewith, with the exception of a portion of a crank 175', have been omitted from Figure 8. However, the operating elements for both of the elevator platforms 135, 135' are clearly shown in other views, such as Figures 1, 4, 6 and 7. It will be noted that the guide blocks 171, 171', in Figure 4, are spaced astraddle the pocket side walls 126, 127 of the turret 125 to permit freedom of movement of said side walls therebetween.

The guide block 171 is suitably secured to a relatively short bar 172 which extends outwardly and is suitably secured to the front edge of the upright side frame member 17 of the frame 10. The lower end of the guide bar 170 has a plate 173 fixed thereto, to which the upper end of a connecting rod 174 is pivotally connected. The lower end of the connecting rod 174 is pivotally connected to a crank 175 which extends rearwardly or inwardly and is fixed on a rocker shaft 176 suitably journaled in the upright side frame members 17 and 18 of the frame 10, and which rocker shaft is common to both of the cranks 175, 175'.

Also fixed on the shaft 176 is a crank or follower arm 177 having a follower 178 thereon which engages the periphery of an irregularly shaped cam 181 fixed on the cam shaft 47 heretofore described. The cam 181 is of such configuration that the elevator platforms 135, 135' remain in lowered position as shown in Figures 4, 6, 7 and 8 as each successive step is imparted to the article turning turret 125. However, immediately following each step of the article turning turret 125, the cam 181 raises the free end of the crank or follower arm 177 to thereby raise the elevator platforms 135, 135' to move the corresponding group of articles A out of the then uppermost pocket P of the article turning turret 125.

Now, it will be observed in Figure 2 that the vertically disposed guide bar 170, or, at least, the plate 173 on the lower end thereof carries a switch operating arm 183 which, when the elevator platform 135 is in lowered position, engages the plunger of switch 94 and maintains the switch 94 in closed position. The switch 94 is suitably secured to a bracket 184 suitably secured to the front edge of the upright side frame member 17 of the frame 10. Thus, as the elevator platforms 135, 135' are moved upwardly, the switch operating arm 183 moves upwardly out of engagement with the plunger of switch 94, permitting the same to open and thereby breaking the circuit to the coil of solenoid 91 so the clutch knife 74 will return to raised position (Figure 6) to stop rotation of shaft 47 upon the completion of each successive revolution thereof.

Article stacker housing

As each successive article or group of articles is turned on its side edges by the article turning turret 125, it passes between the plates 105 and 122 and then between a pair of spaced article stacking guide plates 190, 191 which form the side walls of an article stacker housing broadly designated at 192. The lower portions of the stacking guide plates 190, 191 are preferably flush with the inner surfaces of the respective article turning guide plates 105, 122 and are supported by the respective vertical or upright side frame members 17, 18 of the frame 10, by means of screws 193 and corresponding spacing sleeves 194, in the same manner in which the article turning guide plates 105, 122 are supported. It will be observed in Figure 4 that the distal portions of a pair of vertically disposed stacker frame members or plates 195, 196 are suitably secured to the front edges of the upper portions of the respective upright frame members 17, 18 and project inwardly toward each other. These stacker frame members or plates 195, 196 form a front wall for the stacker housing 192 and have a substantially rectangular frame 197 suitably secured to the outer surfaces thereof and spanning the distance therebetween.

The substantially rectangular frame 197 is provided with an outwardly or forwardly projecting continuous box or container supporting flange 200 which defines an egress or discharge opening outwardly through which each stack of articles is propelled in a manner to be later described. The upper and lower vertical side portions of the flange 200 preferably converge slightly as they project forwardly to facilitate ease in placing an open-ended container or box thereon. Only a portion of the box is shown in broken lines in Figure 6 and is indicated at B. The discharge opening defined by the substantially rectangular frame 197 and its flange 200 is, necessarily, slightly larger than the side of the stack of articles formed between the upper portions of the stacking guide plates 190, 191 to insure that each successive stack of articles may be readily propelled forwardly through said opening and into the container or box B.

It will be observed in Figures 4, 5, 6 and 7 that, as the elevator platforms 135, 135′ move to their uppermost position, they move upwardly slightly above the level of a pair of stack retaining elements or bars 202, 203 which are resiliently urged inwardly toward each other and are biased apart from each other by the corresponding group of articles as they are raised by the elevator platforms 135, 135′.

As the tier or group of articles is elevated by the platforms 135, 135′ above the level of the stacking retaining bars 202, 203, these stack retaining bars then move inwardly to the position shown in Figures 6 and 7 beneath the corresponding tier or group of articles and subsequently support the same as the elevator platforms 135, 135′ return to the lowered position, thus completing a primary cycle in the operation of the machine.

The front stack retaining bar 202 extends downwardly and forwardly at an angle and is cut away at various points along its upper edge, as at 204, thus forming projections on the bar 202 which pass through suitable notches 205 formed in the lower horizontal portion of the substantially rectangular box-supporting frame 197. Opposite ends of the front stack retaining bar 202 are suitably secured to cranks or arms 206, 206′. The arms 206, 206′ extend downwardly and are pivoted at 207, 207′ on the upper portions of the respective guide blocks 171, 171′.

The front stack retaining bar 202 is normally urged inwardly or rearwardly by tension springs 210, 210′ whose outer or front ends are connected to the respective arms 206, 206′ and whose inner or rear ends are connected to the lower ends of the respective front stacker frame members 195, 196. Inward movement of the front stack retaining bar 202 is limited by suitable bumpers 211, 211′, adjustably secured to the respective arms 206, 206′, and which normally engage the lower portions of the respective stacker frame members 195, 196.

The inner or rear stack retaining bar 203 is suitably secured to the lower ends of a pair of levers 215 (Figures 1, 4, 5, 6 and 7) which are pivotally mounted, intermediate their ends, on a transverse shaft 216 mounted in the vertical frame members 17, 18 of the frame 10. Each of the levers 215 has a bumper 217 adjustably mounted thereon which is normally urged against a stop or abutment 220 by a tension spring 221. One end of each tension spring 221 is connected to the upper end of the corresponding lever 215 and the other end thereof is connected to a spring anchor in the form of an angle clip 222, to which the corresponding abutment 220 is suitably secured, and which angle clip is secured to a transverse frame member 223. Opposite ends of the frame member 223 are suitably secured to the proximal surfaces of the upright side frame members 17, 18 of the frame 10.

The present machine is particularly designed for stacking two tiers or groups of two articles each in superposed relationship and then propelling the stacks of articles thus formed forwardly or outwardly through the opening defined by the continuous flange 200 and into the box or container B, the transferring or propelling of the stack of articles through said opening being performed by means of a stack transfer member 225, in the form of a vertically disposed substantially rectangular plate, which is spaced opposite the opening defined by the box supporting flange 200 and normally serves as a back wall of the stacker housing 192. Since two or more cycles in the operation of the article turning turret 125 and the elevator platforms 135, 135′ occur in the interim between each operation of the stack transfer member 225, the operation of the stack transfer member shall be hereinafter referred to as a secondary cycle in the operation of the machine.

As each successive article or group of articles is moved upwardly by the elevator platforms 135, 135′, it is evident that the upper surface of the article or group of articles engages the lower surface of the preceding article or group of articles to move the same upwardly in forming a stack of articles between the stacking guide plates 190, 191. Since the articles are thrust upwardly rather suddenly by the elevator means, including platforms 135, 135′, the uppermost article or tier of articles in each stack is restrained from upwardly movement above the level of the lower surface of the upper horizontal portion of the continuous flange 200 by means of a stop bar 226 suitably secured to the inner or rear surfaces of the stacker frame members 195, 196.

The stack transfer member 225 is suitably secured to a horizontally disposed guide bar 227 mounted for horizontal or longitudinal sliding movement in a guide block 230 carried by the transverse frame member 223. The upper surface of the guide bar 227 has a pivot block 231 suitably secured thereto, to which the front end of a link 232 is pivotally connected. The outer or rear portion of the link 232 is normally connected to a pin 233 pivotally supported in the bifurcated upper end of a crank 234 whose lower end is fixed on a transverse rocker shaft 235 journaled in the upright side frame members 17, 18 of the frame 10. The rocker shaft 235 is caused to rock upon each secondary cycle of the machine by means to be later described to thereby impart reciprocatory forward and rearward movement to the stack transfer member 225 for transferring the stack then supported by the stack retaining bars 202, 203 into the box or container B.

If for any reason the stack of articles encounters an obstruction, the following mechanism is operated: It will be observed in Figure 6 that the pivot pin 233 is disposed in a substantially semicircular cavity 237 provided therefor in the upper surface of the link 232. The pin 233 is normally maintained in engagement with the cavity 237 by a lever or bar 240 which is pivoted, as at 241, on the link 232 and which lever 240 is also engaged by the pivot pin 233. A bolt 242 slidably penetrates the rear portion of the lever 240 and the link 232 and is surrounded by a compression spring 243 which thus causes the lever 240 to resiliently clamp the link 232 against the pin 233.

The rear end of the lever 240 extends beyond the rear end of the link 232 and normally engages the plunger of the normally open switch 101 and thereby holds the same in closed position. The switch 101 is suitably secured to a plate 244 carried by the rear end of the link 232. If for any reason the link 232 or guide bar 227 cannot have a full active stroke from left to right in Figure 6, as heretofore stated, the crank 234 may continue its normal stroke in a clockwise direction in Figure 6, since the pin 233 will ride out of the concave notch 237 in the link 232, causing the lever 240 to move apart from the link 232, in so doing. Of course, in this event, the switch 101 will then be opened to stop the flow of current to all of the electrical parts of the machine, including the electric motor 64, and to thereby stop the machine.

When the obstructed article or articles or other matter has been removed from the path of the stack transfer member 225 or the guide bar 227 or the link 232, the parts just described may be returned to normal operative position as shown in Figure 6 by manually moving the link 232 inwardly or forwardly until the notch 237 again registers with the pin 233.

It will be observed in Figures 1, 3, 5, 7 and 8 that the rocker shaft 235 also has a relatively short crank or arm 250 fixed thereon, to the free end of which the upper end of a link 251 is pivotally connected. The lower end of link 251 has a yoke 252 fixed thereto whose lower end slidably straddles the first-named rocker shaft 176. The yoke 252 has a cam follower 253 projecting therefrom which engages with an irregularly shaped groove 254 formed in one face of a face cam 255 rotatably mounted on the rocker shaft 176. The face cam 255 has a gear 256 integral therewith, or suitably secured thereto, which meshes with a gear 257 fixed on the cam shaft 47.

In this instance, since the stack transfer member 225 is operated upon every two cycles of operation of the article turning turret 125 and the elevator platforms 135, 135', the gears 256, 257 should have a two to one ratio; that is, the gear 257 should rotate two revolutions to each revolution of the gear 256. Of course, if a greater number of tiers or groups of articles are to be stacked in superposed relation in the stacker housing 192 in advance of each active stroke of the stack transfer member 225, it is evident that the ratio between the gears 256, 257 should be varied accordingly and the groove 254 in the cam 255 should also be formed accordingly. Such changes in the machine are well known expedients and may easily be made by a skilled mechanic and, therefore, a separate illustration and description thereof is deemed unnecessary.

It is evident that, during the first revolution of the shaft 47 in each secondary cycle of the machine, the follower 253 (Figure 5) remains in engagement with the high surface of the groove 254 in the face cam 255. On the other hand, during the course of the latter portion of a revolution of every second revolution of the shaft 47; that is, after the second tier of each successive stack of articles has been positioned in alinement with the stack transfer member 225, the low surface of the groove 254 in face cam 255 then engages the follower 253 and causes the yoke 252 and link 251 to move downwardly. Of course, this rocks the shaft 235 and the crank 234 in a clockwise direction in Figure 6 to thereby impart an active stroke to the stack transfer member 225. The high surface of the groove 254 in face cam 255 then again engages the follower 253 to return the stack transfer member 225 to the inoperative position shown in Figures 6 and 7 to complete a secondary cycle in the operation of the machine.

Due to the weight of each successive stack of articles formed in the stacker housing 192, it is preferable that a tension spring 260 (Figure 6) is provided, one end of which is connected to a medial portion of the crank 234 and the other end of which is connected to the frame 10, to assist in imparting an active stroke to the stack transfer plate 225 and to thereby prevent excessive stress of the follower 253 and cam 255.

It is thus seen that an improved apparatus is provided having means for continuously feeding articles thereinto, rotating or turning the articles so that their original side surfaces face downwardly, automatically stacking articles or groups of articles in superposed relation and, thereafter automatically transferring the articles into a suitable container or box.

This machine is portable to the extent that it may be used in association with any type of machine in which articles are previously processed and wherein it is desired that the articles are subsequently stacked and boxed, or upended or turned on their sides and stacked and boxed in succession automatically.

In the drawings and specification, there has been set forth a preferred embodiment of the invention, and although specific terms are employed, they are used in a generic and descriptive sense only, and not for purposes of limitation, the scope of the invention being defined in the claims.

I claim:

1. Apparatus for stacking articles and packaging the stacks in containers comprising a vertically reciprocable stacking platform, an open-framed turret having circularly arranged article receiving pockets through which said platform is movable, means for feeding said articles into said pockets, means for partially rotating said turret to position said articles just above said platform while it is in lowered position, means operable automatically upon each successive article being positioned above the stacking platform for elevating and then lowering said platform, means for retaining each successive article elevated by the platform in a predetermined position spaced above the normal lowered position of the platform whereby each successive article elevated by the platform will engage the article disposed thereabove to elevate the same, and stack transfer means operable automatically upon a predetermined number of articles being stacked above the platform for transferring the stack to one side of the vertical plane of the platform.

2. Apparatus for boxing articles comprising a turret having a plurality of circularly arranged pockets thereon, means for successively feeding articles into one of said pockets, means operable automatically upon feeding a predetermined number of articles into the latter pocket for imparting a step in rotational movement to said turret to thereby turn said articles in said pocket about the axis of said turret, means operable automatically upon each step in movement by said turret for moving the articles previously positioned in said pocket out of the pocket, means for supporting said articles in spaced relation to each corresponding pocket upon being moved out of said pocket to form a stack of said articles, means for supporting a box adjacent said stack of articles, and means operable automatically upon a predetermined number of said articles being stacked for transferring said stack of articles into said box.

3. Apparatus for boxing articles comprising a stacker housing, being open at its lower end, a revolvable turret having a plurality of circularly arranged pockets disposed adjacent the lower end of said stacker housing, means for successively directing articles into said pockets, article lifting means movable through the uppermost pocket of said turret, means for imparting step by step rotational movement to said turret to successively move said article filled pockets to a point slightly above said lifting means, means operable automatically upon said articles being positioned above said article lifting means for imparting upward movement to said lifting means to raise said articles, means for retaining each successive group of articles raised by the lifting means in raised position independently of said lifting means to thereby form a stack of articles in said stacker housing, said stacker housing being provided with an opening in one side thereof adjacent which a box may be positioned, and means operable automatically upon a predetermined number of tiers of articles being stacked for transferring the stack of articles thus formed through said opening and into the box.

4. Apparatus for positioning stacks of articles in a common container comprising a vertically reciprocable stacking platform normally disposed in a lowered position, a turret having circularly arranged article receiving pockets, conveyor means for successively feeding articles into said pockets, means for partially rotating said turret to position said articles just above said lowered platform, means operable automatically upon a predetermined number of said articles being positioned above the stacking platform for elevating and then lowering the platform, means for retaining each successive group of articles elevated by the platform in a predetermined position spaced above the normal lowered position of the platform whereby each successive group of articles elevated by the platform will engage the articles disposed thereabove to elevate the same, and stack transfer means operable automatically upon a predetermined number of groups of articles being stacked above the stacking platform for transferring the stack of articles to one side of the vertical plane of the stacking platform.

5. Apparatus for positioning a plurality of articles in a common container comprising a turret having article receiving pockets thereon normally projecting horizontally in a radial plane from said turret, means for successively feeding articles into one of said pockets, means operable automatically upon a predetermined number of articles being positioned in said pocket for imparting a step by step movement to said turret to cause the pocket thereon to move upwardly in an arcuate path for revolving the articles in said pocket to a different attitude, normally lowered elevator means operable automatically for raising the articles in the pocket thus positioned out of said pocket, means for retaining each successive group of articles elevated by the elevator means in a predetermined position spaced above the normal lowered position of the elevator means whereby each successive group of articles elevated by the elevator means will engage the group disposed thereabove to elevate the same to thereby form a stack of articles, and stack transfer means operable automatically upon a predetermined number of groups of articles being stacked above the elevator means for transferring the stack thus formed to one side of the vertical plane of the elevator means.

6. In a structure according to claim 5, a fixed frame disposed adjacent said stack transfer means and being provided with an opening therein alined with the stack transfer means, said frame having a continuous flange projecting outwardly therefrom and defining said opening therein, and the outer surface of said flange being tapered outwardly relative to the transfer means and inwardly toward said opening for supporting said container thereon.

7. Apparatus for positioning a plurality of articles in a common container comprising a turret including a spider having a plurality of circularly arranged pockets projecting radially therefrom, each pocket including a pair of spaced substantially parallel pocket side plates, means for successively feeding articles, one at a time, into each successive pocket as each successive pocket occupies a predetermined horizontal position, means operable automatically upon a group including a predetermined number of articles being fed into each successive pocket for imparting a step by step movement to said turret and wherein the pocket having the articles therein is moved upwardly and then horizontally in an arcuate path for revolving the articles therein, at least one elevator platform normally disposed below the level of each successive pocket as it is moved to the last-named upward position, means operable automatically upon each successive pocket being moved to said upward position for raising and then lowering the elevator platform between the plates of the corresponding pocket, means for retaining each successive group of articles elevated by the elevator platform in a predetermined position spaced above the normal lowered position of the platform and above the arcuate path of travel of said pockets whereby each successive group of articles elevated by the platform will engage the group of articles disposed thereabove to elevate the same to thereby form a stack of articles, and stack transfer means operable automatically upon a predetermined number of groups of articles being stacked above the platform for transferring the stack of articles to one side of the vertical plane of the platform.

8. Apparatus for boxing a plurality of articles each having a bendable flap normally projecting upwardly therefrom including a turret having a plurality of circularly arranged radially extending pockets thereon, each of said pockets being provided with spaced substantially parallel side walls, means for feeding said articles, one at a time, into each successive pocket as said pockets are moved to a given horizontal position and wherein the side walls of each pocket moved to said given horizontal position are disposed in vertically spaced relationship, means for folding the flap on each article against the upper portion of each article as it is admitted to a pocket, means for retaining said flap in folded position while said articles are in said pockets, means operable automatically each time a predetermined number of articles are admitted into a pocket for imparting a step by step movement to said turret, whereby said articles admitted to a pocket are caused to assume a different position from that assumed at the time they were fed into said pocket, means operable automatically following a step by step movement by said turret for moving the articles upwardly out of said pocket, means for retaining each successive group of articles removed from each successively positioned pocket in spaced relation to the path of travel of said pocket to thereby form a stack of articles, and means operable automatically upon a stack of a predetermined number of articles being formed for moving said stack of articles to one side of the position to which they were moved when removed from successive pockets of said turret.

9. Apparatus for boxing a plurality of articles each having a bendable flap normally projecting upwardly therefrom including a turret, means for driving said turret in a step-by-step manner, said turret having a plurality of circularly arranged radially extending pockets thereon, each of said pockets being provided with spaced substantially parallel side walls, means for feeding said articles, one at a time, into a given one of said pockets while said given pocket is in a horizontal position with its side walls disposed in vertically spaced relationship, means for folding the flap on each article against the upper portion of each article as it is admitted to said given pocket, means for retaining said flap in folded position while said articles are in said pockets, means operable automatically for actuating said driving means upon a predetermined number of articles being admitted into said given pocket, whereby said articles previously admitted to the given pocket are caused to assume a different position from that assumed at the time they were fed into said given pocket, means operable automatically following a step by step movement by said turret for moving the articles radially out of said given pocket, means for retaining each successive group of articles removed from each successively positioned in pocket in spaced relation to the path of travel of said pocket to thereby form a stack of articles, and means operable automatically upon a stack of a predetermined number of articles being formed for moving said stack of articles to one side of the original position to which they were moved when removed from the pocket of said turret.

10. Apparatus for positioning a plurality of articles in a common container comprising a turret mounted on a horizontal axis and having a plurality of circularly spaced pockets projecting radially therefrom, means for feeding the articles into each successive pocket when in a predetermined position, electrically operable means responsive to a predetermined number of articles forming a group of articles being positioned in each successive pocket for imparting a step by step movement to said turret and whereby arcuate movement is imparted to the pocket having the articles therein, each pocket having an opening therethrough, elevator means movable through the opening of each successive pocket following each step in movement by the turret for lifting each successive group of articles out of the pocket in which said group was previously positioned, means for retaining each successive group of articles elevated by the elevator means in a predetermined position spaced from the circular plane of the pockets of said turret whereby each successive group of articles elevated by the elevator means will engage the group of articles disposed thereabove to elevate the same to thereby form a stack of articles, and stack transfer means operable automatically upon a predetermined number of groups of articles being stacked above the elevator means for transferring the stack of articles to one side of the vertical plane of said elevator means.

11. Apparatus for positioning a plurality of articles in a common container comprising a turret mounted on a horizontal axis and having a plurality of circularly spaced pockets projecting radially therefrom, a pair of spaced plates defining the walls of each pocket, means for feeding the articles between the plates of each successive pocket when in a predetermined position, means responsive to a predetermined number of articles, forming a group of articles, being positioned in each successive pocket for imparting a step by step movement to said turret and whereby arcuate movement is imparted to the corresponding pocket having the articles therein, elevator means operable following each step by step movement by the turret for lifting each successive group of articles out of the pocket in which said group was previously positioned, means for retaining each successive group of articles elevated by the elevator means in a predetermined position spaced above the circular plane of the pockets of said turret whereby each successive group of articles elevated by the elevator means will engage the group of articles disposed thereabove to elevate the same to thereby form a stack of articles, means for supporting a container to one side of the vertical plane of the elevator means, and stack transfer means operable automatically upon a predetermined number of groups of articles being stacked above the elevator means for transferring the stack of articles into said container.

12. Apparatus for positioning a plurality of articles in a common container comprising a turret mounted on a horizontal axis and having a plurality of circularly spaced pockets projecting radially therefrom, a pair of spaced plates defining the walls of each pocket, means for feeding the articles between the plates of each successive pocket when in a predetermined horizontal position, electrically operable means responsive to a predetermined number of articles, forming a group of articles, being positioned in each successive pocket for imparting a step by step movement to said turret and whereby upward arcuate movement is imparted to the corresponding pocket having the articles therein, cam controlled elevator means operable following each step by step movement by the turret for lifting each successive group of articles out of the corresponding pocket previously moved upwardly by the turret, means for retaining each successive group of articles elevated by the elevator means in a predetermined position spaced above the uppermost pocket of said turret whereby each successive group of articles elevated by the elevator means will engage the group of articles disposed thereabove to elevate the same to thereby form a stack of articles, means for supporting a container to one side of the vertical plane of the elevator means, and stack transfer means operable automatically upon a predetermined number of groups of articles being stacked above the elevator means for transferring the stack of articles into said container.

13. Apparatus for boxing articles comprising a turret having a plurality of circularly arranged pockets thereon, means for successively feeding articles into one of said pockets, means operable automatically upon feeding a predetermined number of articles into the latter pocket for imparting a step in rotational movement to said turret to thereby turn said articles in said pocket about the axis of said turret, means operable automatically upon each step in movement by said turret for moving the articles previously positioned in said pocket out of the pocket, means for supporting said articles in spaced relation to each corresponding pocket upon being moved out of said pocket to form a stack of said articles, and stack transfer means operable automatically upon a predetermined number of articles being stacked by transferring the stack.

14. Apparatus for boxing articles comprising a turret having a plurality of circularly arranged pockets thereon, means for successively feeding a predetermined number of articles into one of said pockets, stop means for preventing an excessive number of articles being fed into said pocket, means operable automatically upon feeding a predetermined number of articles into the latter pocket for imparting a step in rotational movement to said turret to thereby turn said articles in said pocket about the axis of said turret, means operable automatically upon each step in movement by said turret for moving the articles previously positioned in said pocket out of the pocket, means for supporting said articles in spaced relation to each corresponding pocket upon being moved out of said pocket to form a stack of said articles, and stack transfer means operable automatically upon a predetermined number of articles being stacked by transferring the stack.

References Cited in the file of this patent

UNITED STATES PATENTS

| | | |
|---|---|---|
| 18,575 | Crashaw | Nov. 10, 1857 |
| 1,467,019 | Tzibides | Sept. 4, 1923 |
| 1,839,925 | McKaig | Jan. 5, 1932 |
| 2,498,071 | Dalziel et al. | Feb. 21, 1950 |